(12) United States Patent
Henderson, Jr. et al.

(10) Patent No.: US 12,461,023 B2
(45) Date of Patent: Nov. 4, 2025

(54) SUBSURFACE UNDERLYING INCIPIENT FAILURE INDICATOR IN WEAR COMPONENTS

(71) Applicant: Caterpillar Inc., Peoria, IL (US)

(72) Inventors: Russell Ross Henderson, Jr., Havana, IL (US); Ananda Sudhakar Ponnusamy, Naperville, IL (US); Abdul K Maoued, Peoria, IL (US); Kurt Steven Goslovich, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 505 days.

(21) Appl. No.: 17/882,511

(22) Filed: Aug. 5, 2022

(65) Prior Publication Data
US 2024/0044779 A1   Feb. 8, 2024

(51) Int. Cl.
*G01N 21/31* (2006.01)
*F01D 21/00* (2006.01)
*G01N 33/28* (2006.01)

(52) U.S. Cl.
CPC .............. *G01N 21/31* (2013.01); *F01D 21/00* (2013.01); *F01D 21/003* (2013.01); *G01N 33/2835* (2013.01); *G01N 33/2888* (2013.01)

(58) Field of Classification Search
CPC ............... G01N 21/31; G01N 33/2835; G01N 33/2888; F01D 21/00; F01D 21/003
See application file for complete search history.

(56) References Cited

U.S. PATENT DOCUMENTS

| | | | |
|---|---|---|---|
| 4,658,638 | A | 4/1987 | Plahmer |
| 5,537,336 | A | 7/1996 | Joyce |
| 5,817,928 | A | 10/1998 | Garvey, III et al. |
| 6,752,604 | B2 | 6/2004 | Althouse |

(Continued)

OTHER PUBLICATIONS

Written Opinion and International Search Report for Int'l. Patent Appln. No.PCT/US2023/070656, mailed Nov. 7, 2023 (9 pgs).

(Continued)

*Primary Examiner* — Lee E Rodak
*Assistant Examiner* — Byung Ro Lee
(74) *Attorney, Agent, or Firm* — Lee & Hayes, PLLC

(57) ABSTRACT

Manufactures and methods implement wear components containing a subsurface underlying incipient failure indicator, machinery parts including at least one wear component containing a subsurface underlying incipient failure indicator, and mechanical systems including at least one machinery part including at least one wear component containing a subsurface underlying incipient failure indicator. An elastomeric seal has one or more failure indicators including a spectrally distinguishable element and/or molecule from operating-native constituent matter of a mechanical system underlying at one or more subsurface distances, including at least one subsurface distance within an incipient failure region. Abrasive wear of an elastomeric seals can expose subsurface strata having failure indicators embedded therein, each exposure causing a spectrally distinguishable element and/or molecule to mingle with lubricant of the mechanical system. Based on detecting the failure-indicating characteristic spectrum, the mechanical system can be removed from operation and one or more elastomeric seals replaced.

17 Claims, 5 Drawing Sheets

(56) References Cited

U.S. PATENT DOCUMENTS

| | | | |
|---|---|---|---|
| 7,259,017 B2 | 8/2007 | Kawabata et al. | |
| 2009/0240471 A1 | 9/2009 | Novis | |
| 2010/0276504 A1* | 11/2010 | Adams | C10B 33/006 |
| | | | 239/443 |
| 2016/0178064 A1 | 6/2016 | Vatovec et al. | |
| 2019/0040959 A1 | 2/2019 | Sommers | |
| 2021/0190209 A1 | 6/2021 | Guo et al. | |
| 2022/0349474 A1* | 11/2022 | Yu | F16J 15/3204 |

OTHER PUBLICATIONS

Zeng et al., "Monitoring of non-Ferrous Wear Debris in Hydraulic Oil by Detecting the Equivalent Resistance of Inductive Sensors", Micromachines 2018, 9, 117, 8 pages.

* cited by examiner

SUBSURFACE UNDERLYING INCIPIENT FAILURE INDICATOR IN WEAR COMPONENTS

TECHNICAL FIELD

The present disclosure relates to wear components of mechanical systems. More specifically, the present disclosure relates to wear components containing a subsurface underlying incipient failure indicator.

BACKGROUND

The routine wear of mechanical components during operation of mechanical systems is a major source of expense for operators of such mechanical systems. Among the most common causes of wear, abrasive wear occurs in mechanical systems when a hard surface slides against another surface, removing material from the other surface. Furthermore, fatigue occurs in mechanical systems when a material experiences cyclic loading, i.e., repeated load forces, causing the material to develop cracks at or beneath its surface. Over the operating lifetime of a mechanical system, some components which are subject to substantial wear damage will cause system performance to degrade, and such components can be replaced to restore the system to its previous performance without replacing the entire system. Such replaceable components subject to wear can be collectively referred to as "wear parts" or "wear components."

A variety of forms of wear cause performance of mechanical systems, and their wear components, to gradually experience incipient failure rather than catastrophic failure. Since incipient failure manifests gradually and may not cause substantial performance degradation for some time, operators of mechanical systems containing wear components suffering incipient failure due to wear can continue to operate these systems normally without detecting the occurrence of wear, until the wear worsens and results in catastrophic failure.

Consequently, operators of mechanical systems are at risk of failing to prevent catastrophic failure if they are unable to detect incipient failure resulting from wear in a timely fashion. Since wear components are frequently located at mechanical seals of systems, they are not readily accessible by operators for visual inspection of wear. Various spectroscopic oil analysis techniques have been developed to indirectly measure mechanical wear: by sampling fluid collected from lubricated machinery, elements and molecules present in the sample can be identified, to determine the extent to which metal debris has been produced from wear.

However, though oil analysis is routinely used to detect wear of metal components, non-metal components, such as elastomers used in mechanical seals, are also subject to mechanical wear. The incipient failure of mechanical seals from wear also results in gradual failure of a mechanical system. Consequently, it is desired to detect any mechanical wear, including elastomeric wear, on a timely basis during incipient failure, without relying on outright failure of a mechanical system as warning signs.

U.S. Pat. No. 6,752,604 (the "'604 patent") describes encapsulation of tracer material into vanes of a sliding vane pump, and the detection of vane wear by detecting discharge of the tracer material when the vanes reach a wear condition. However, such tracer materials require heterodox detection techniques, such as collection of tracer materials using a magnet. Such heterodox wear detection techniques as described by the '604 patent add superfluous complexity to the routine operation and maintenance of mechanical systems, serving no purpose other than detecting a single tracer material.

Example embodiments of the present disclosure are directed toward overcoming the deficiencies described above.

SUMMARY

In an example of the disclosure, an elastomeric member includes an outer face, a first subsurface stratum underlying at least part of the outer face, and a first incipient failure indicator embedded through the first subsurface stratum. The first incipient failure indicator includes an element or a molecule spectrally distinguishable from operating-native constituent matter of a mechanical system.

In another example of the disclosure, an actuator includes a barrel, a piston member, a rod member, a first elastomeric seal fitted into a circumferential first gland of the piston member adjacent to the barrel, and a second elastomeric seal fitted into a circumferential second gland of the barrel adjacent to the rod. The first elastomeric seal has a first subsurface stratum having a first incipient failure indicator embedded through the first subsurface stratum. The second elastomeric seal has a second subsurface stratum having a second incipient failure indicator embedded through the second subsurface stratum.

In still another example of the disclosure, a system includes a first hydraulic actuator, and a second hydraulic actuator. The first hydraulic actuator has a first elastomeric seal fitted into a circumferential first gland of the first hydraulic actuator. the second hydraulic actuator has a second elastomeric seal fitted into a circumferential second gland of the second hydraulic actuator. The first elastomeric seal has a first subsurface stratum having a first incipient failure indicator embedded through the first subsurface stratum. The second elastomeric seal has a second subsurface stratum having a second incipient failure indicator embedded through the second subsurface stratum. The first incipient failure indicator and the second incipient failure indicator each includes an element or a molecule spectrally distinguishable from operating-native constituent matter of a mechanical system.

DETAILED DESCRIPTION

Wherever possible, the same reference numbers will be used throughout the drawings to refer to the same or like parts.

Figure 1:
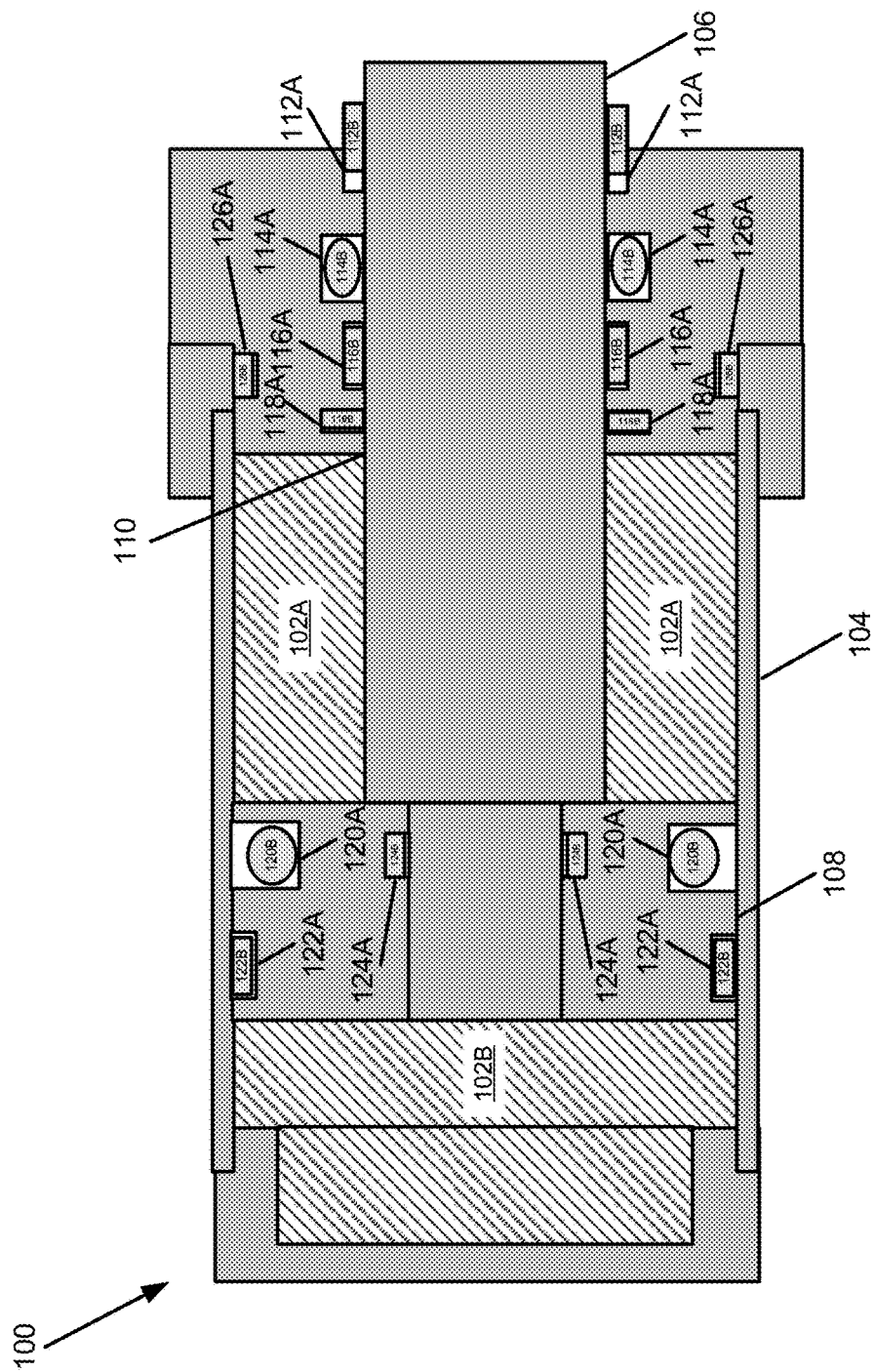
FIG. 1 illustrates a cross-section view of a hydraulic cylinder.

FIG. 1 illustrates a cross-section view of a hydraulic cylinder 100. By way of example, in a common hydraulic cylinder, a hydraulic fluid chamber 102 (hatched) is contained within a cylinder barrel 104, and this fluid chamber 102 is enclosed by the alignment of a rod 106 and a piston 108 within the cylinder barrel 104.

The work performed by many mechanical systems, such as stationary machine tools and motorized construction machinery and agricultural machinery, is driven by hydraulic actuator components such as a hydraulic cylinder 100 as illustrated in FIG. 1.

The piston 108 further divides the fluid chamber 102 into two partitions 102A and 102B, one in either direction of actuation motion of the piston 108. The actuation of such hydraulic actuators is powered by pressurized working fluids pumped through the fluid chamber enclosed by the cylinder barrel 104 and divided by the piston 108. The powered actuation of the hydraulic cylinder 100 requires that working fluid does not mix between the two chamber partitions 102A and 102B, and that working fluid does not leak out from the overall fluid chamber 102.

A rod and piston assembly does not mate to a cylinder barrel 104, but rather actuates through an opening in the cylinder barrel 104 (henceforth illustrated as opening 110). Likewise, the piston 108 actuates through the fluid chamber 102. Such actuation leaves pathways for fluid to leak through, and, in order to permit actuation, such pathways cannot be statically sealed. Consequently, mechanical seals in hydraulic actuator components are commonly installed to perform dynamic sealing, wherein the seal deforms under pressure of fluid to block outward passage of fluid in the direction of pressure.

In a common hydraulic cylinder, mechanical seals are established by the combination of a gland and an elastomeric member, such as an O-ring. Where two surfaces are adjacent, a gland is formed as a groove circling a circumference of one of the two surfaces, where multiple glands can be formed circling multiple circumferences of the one of the two surfaces. For each gland, an elastomeric seal or a wear ring is fitted into the gland, and each of an elastomeric seal and a wear ring is a wear component subject to substantial wear over the course of operation of the hydraulic cylinder.

In the event that at least one of the two adjacent surfaces is not stationary relative to the other during operation of the hydraulic cylinder in a mechanical system, the elastomeric seal can be fitted freely into a gland without being statically affixed. Furthermore, a wear ring, as shall subsequently be described, can be fitted into another gland without being statically affixed. In contrast, in the event that both of the adjacent surfaces are stationary relative to the other during operation of the hydraulic cylinder in a mechanical system, the elastomeric seal can be affixed in the gland relative to both of the adjacent surfaces.

Generally, an elastomeric seal can be a circular member manufactured by molding an elastomeric compound. An elastomeric compound can be composed of a combination of a polymer and other agents and/or additives, which is cured by a process such as vulcanization, causing the polymer to form cross-links resulting in a non-plastic state, wherein the elastomeric compound gains elastic properties such that it returns to its original shape after deformation. Curing of an elastomeric compound making up an elastomeric seal is generally performed while shaping the elastomeric seal in a molding process.

In contrast, a wear ring can be a circular ring manufactured by molding a variety of possible materials, including metals, thermosetting elastomeric compounds, and thermoplastic compounds which do not have elastic properties. Rather than sealing, a wear ring between two adjacent surfaces guides movement of one surface against the other and controls levels of friction between the two surfaces.

By way of example, as illustrated in FIG. 1, the cylinder barrel 104 includes glands 112A, 114A, 116A, and 118A, from outermost to innermost, on a surface adjacent to the rod 106. Furthermore, the piston 108 includes glands 120A and 122A on a surface adjacent to the cylinder barrel 104. Additionally, between two interior surfaces, the cylinder barrel 104 includes gland 124A on one of these two interior surfaces. Additionally, the piston 108 includes gland 126A on a surface adjacent to an inner segment of the rod 106.

Within the gland 112A, an elastomeric seal 112B is set. The gland 112A is open externally, and the elastomeric seal 112B extends outwards of the gland 112B over the rod 106. The elastomeric seal 112B can be a wiper seal configured to seal the interior of the cylinder barrel 104 from entry of external matter such as contaminants.

Within each of the glands 114A, 118A, and 120A, a respective elastomeric seal 114B, 118B, and 120B is set. Each of the elastomeric seals is confined within its respective gland by the adjacency of a surface next to the respective gland, enclosing the gland. Each of the elastomeric seals can move freely within its respective gland, providing a dynamic seal.

Within each of the glands 116A and 122A, a respective guide ring 116B and 122B is set. Each of the guide rings is confined within its respective gland by the adjacency of a surface next to the respective gland, enclosing the gland. Each of the guide rings can turn circumferentially within its respective gland relative to the two adjacent surfaces.

With each of the glands 124A and 126A, a respective elastomeric seal 124B and 126B is set. Each of the elastomeric seals is statically set between two adjacent surfaces which are stationary relative to each other (interior surfaces of the cylinder barrel 104 in the case of gland 124A, and the piston 108 and the rod 106 in the case of gland 126A), providing a static seal rather than a dynamic seal.

Consequently, the elastomeric seal 112B prevents external matter from entering the cylinder barrel 104; the elastomeric seals 114B and 118B collectively prevent pressurized working fluid in the chamber partition 102A from leaking out of the cylinder barrel 104, with one seal acting as a buffer for another seal; and the elastomeric seal 120B prevents pressurized working fluid in either the chamber partition 102A or the chamber partition 102B from leaking into the other chamber partition. In general, leakage of working fluid would cause the hydraulic cylinder 100 to become depressurized, impeding performance of work by the hydraulic cylinder and by any mechanical system that include the hydraulic cylinder.

Among such examples of elastomeric seals, those elastomeric seals fitted to perform dynamic sealing are subject to abrasive wear from repeated contact of the elastomeric seal against one or more adjacent surfaces. Those elastomeric seals fitted to perform dynamic sealing is also subject to nibbling, cracking, spiral failure, or other modes of failure which can gradually develop in an incipient fashion before transitioning into catastrophic failure.

Because moving components of mechanical systems are lubricated prior to, and during, operation, oil analysis techniques have been developed wherein samples of a lubricant, from a mechanical system during the course of operation (subsequently "operating lubricant," for brevity), are collected over this duration for the purpose of predictive maintenance. Where two surfaces are adjacent in a mechanical system and at least one of the surfaces moves relative to the other during operation of the mechanical system, lubricant is applied to at least one of the two surfaces to reduce friction between the two surfaces during operation of the mechanical system.

During the course of operation of a mechanical system, various elemental matter and/or molecular matter can enter the operating lubricant in a mechanical system, and the presence of such elemental matter and/or molecular matter can be detected in samples of the operating lubricant by spectrometric oil analysis ("SOA"), which generally refers to various techniques based on spectroscopic analysis of operating lubricant samples to determine elemental composition, such as atomic absorption spectroscopy ("AAS"), inductively coupled plasma spectroscopy ("ICP"), and the like; as well as various techniques based on spectroscopic analysis of operating lubricant samples to determine molecular composition, such as Fourier transform infrared ("FTIR") spectroscopy and the like.

Oil analysis techniques detect wear debris produced by metallic wear components (subsequently referenced as "wear metals," for brevity) depending on respective compositions of the parts of a mechanical system. Furthermore, because external matter can enter mechanical systems during the course of operation, oil analysis techniques further detect common contaminants found in operating environments of mechanical systems or from subsystems of mechanical systems. Furthermore, lubricant compositions commonly further contain various additives which tailor or improve the performance of the lubricant for various settings. A heterogeneous range of additives can result in different properties in different formulations of lubricants.

SOA techniques are performed upon an operating lubricant sample taken from a mechanical system, wherein radiation is emitted from a radiation source, passed through the operating lubricant sample, captured by a radiation detector, and converted to electrical signals by the radiation detector. The electrical signals are then converted to one or more spectra measurements, such as absorbance and transmittance.

According to AAS spectroscopy or ICP spectroscopy, sample spectra indicate the presence of various elements in the lubrication sample. According to FTIR spectroscopy, sample spectra generally indicate the presence of various molecular bonds making up molecules in the lubrication sample.

To facilitate the analysis of operating lubricant composition from sample spectra to be more efficient than human analysis, a computing system can be configured to receive sample spectra for an operating lubricant sample as input, compare a sample spectra against a reference spectrum for the same lubricant to derive a difference spectrum, and perform regression on the difference spectrum to determine multiple constituent spectra that make up the difference spectrum.

After a computing system determines magnitude of various constituent spectra, the computing system can calculate a concentration of various matters in the lubricant sample.

Example embodiments of the present disclosure provide wear components containing a subsurface underlying incipient failure indicator, a machinery part including at least one wear component containing a subsurface underlying incipient failure indicator, and a mechanical system including at least one machinery part including at least one wear component containing a subsurface underlying incipient failure indicator.

Figure 2:
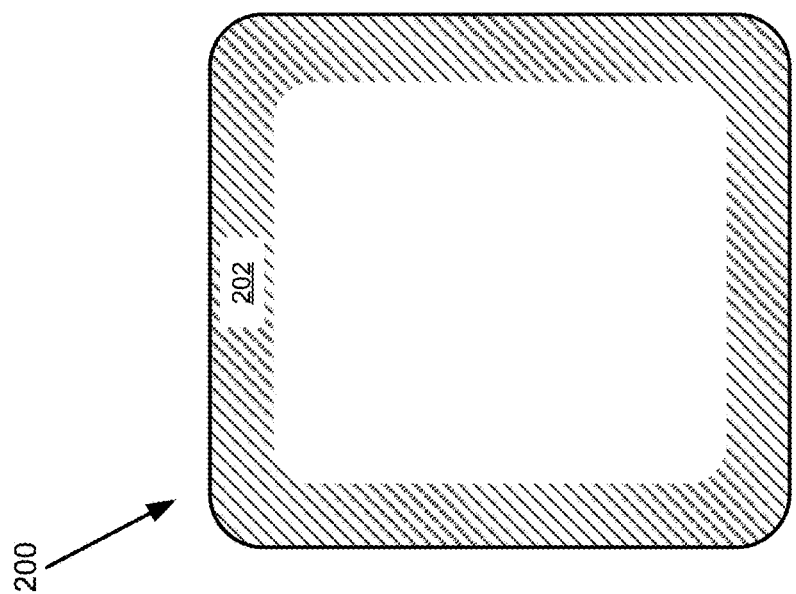
FIG. 2 illustrates a cross-section view of an elastomeric seal including an incipient failure region.

FIG. 2 illustrates a cross-section view of an elastomeric seal 200 including an incipient failure region. The incipient failure region 202 includes a hatched region of at least one side, or at least one radial slice, of the elastomeric seal 200. During the course of operation of a mechanical system, an elastomeric seal 200 which provides a dynamic seal can freely move within a gland, and thus is subject to abrasive wear against adjacent surfaces of the gland. In operation of a mechanical system, an elastomeric seal 200 can receive some degree of abrasive wear on a same side while continuing to substantially provide a dynamic seal against working fluids on one or more sides of the gland, as described above with reference to FIG. 1. The incipient failure region 202 is approximately no larger than, and can be smaller than, this region where the reach of abrasive wear to the innermost edge of this region does not yet lead to catastrophic failure of a dynamic seal.

According to example embodiments of the present disclosure, an elastomeric seal is manufactured as an elastomeric member including a subsurface underlying incipient failure indicator. The failure indicator can include any combination of elemental matter or a molecular compound. The failure indicator can include any combination of a particulate matter which may or may not be soluble in lubricants, and a hydrophobic molecule soluble in lubricants.

The failure indicator can include any element having a characteristic spectrum which is distinguishable, in spectroscopic analysis, from characteristic spectra of metallic wear compounds, characteristic spectra of contaminants, and characteristic spectra of lubricant additives. The failure indicator can include any molecule having a characteristic spectrum which is distinguishable, in spectroscopic analysis, from characteristic spectra of metallic wear compounds, characteristic spectra of contaminants, and characteristic spectra of lubricant additives. In other words, characteristic spectra of one or more constituents of the failure indicator are distinguishable from characteristic spectra of one or more constituents of matter native to an operating mechanical system (subsequently, "operating-native constituent matter," for brevity), even if such constituent matter is foreign to a newly assembled mechanical system.

For different mechanical systems in different operating environments, and containing different lubricant additives, operating-native constituent matter can be defined differently. By way of example, for stationary machine tools operating indoors, soil can be excluded from possible contaminants, and so silicon is less likely to be present among contaminants, whereas for motorized construction machinery and agricultural machinery operating outdoors, soil is included among possible contaminants, and so silicon is likely to be present among contaminants. By way of another example, for mechanical systems where anti-wear additives are added to lubricants, phosphorous and zinc are likely to be present in lubricant additives, whereas for mechanical systems where detergent additives are added to lubricants, calcium is likely to be present in lubricant additives. Therefore, different mechanical systems have different sets of operating-native constituent matter, and so for these different mechanical systems, different sets of failure indicators can have characteristic spectra distinguishable from characteristic spectra of operating-native constituent matter.

However, according to example embodiments of the present disclosure, failure indicators can also have characteristic spectra which is broadly distinguishable from characteristic spectra of operating-native constituent matter for a variety of mechanical systems. By way of example, elements and molecules not present in lubricants (regardless of presence of wear debris, and regardless of whether the lubricant is single-grade or multigrade) or lubricant additives (for a variety of mechanical systems), not present in wear debris (for a variety of mechanical systems), and not present in contaminants (for operating environments of a variety of mechanical systems), and furthermore not present in a variety of mechanical systems themselves, will only increase in concentration over the normal operation of a mechanical system in the event that they are present as a failure indicator.

For instance, cerium is not present in lubricants or lubricant additives for a variety of mechanical systems, is not present in wear debris for a variety of mechanical systems, is not present in contaminants for operating environments of a variety of mechanical systems, and is furthermore not present in a variety of mechanical systems themselves. Thus, for a variety of mechanical systems, failure indicators containing cerium can have characteristic spectra distinguishable from characteristic spectra of operating-native constituent matter.

For instance, yttrium is not present in lubricants or lubricant additives for a variety of mechanical systems, is not present in wear debris for a variety of mechanical systems, is not present in contaminants for operating environments of a variety of mechanical systems, and is furthermore not present in a variety of mechanical systems themselves. Thus, for a variety of mechanical systems, failure indicators containing yttrium can have characteristic spectra distinguishable from characteristic spectra of operating-native constituent matter.

For instance, lanthanum is not present in lubricants or lubricant additives for a variety of mechanical systems, is not present in wear debris for a variety of mechanical systems, is not present in contaminants for operating environments of a variety of mechanical systems, and is furthermore not present in a variety of mechanical systems themselves. Thus, for a variety of mechanical systems, failure indicators containing lanthanum can have characteristic spectra distinguishable from characteristic spectra of operating-native constituent matter.

For instance, scandium is not present in lubricants or lubricant additives for a variety of mechanical systems, is not present in wear debris for a variety of mechanical systems, is not present in contaminants for operating environments of a variety of mechanical systems, and is furthermore not present in a variety of mechanical systems themselves. Thus, for a variety of mechanical systems, failure indicators containing scandium can have characteristic spectra distinguishable from characteristic spectra of operating-native constituent matter.

For instance, zirconium is not present in lubricants or lubricant additives for a variety of mechanical systems, is not present in wear debris for a variety of mechanical systems, is not present in contaminants for operating environments of a variety of mechanical systems, and is furthermore not present in a variety of mechanical systems themselves. Thus, for a variety of mechanical systems, failure indicators containing zirconium can have characteristic spectra distinguishable from characteristic spectra of operating-native constituent matter.

Moreover, it should be understood that distinguishability of any failure indicator characteristic spectrum from any operating-native constituent matter characteristic spectrum does not necessarily mean that the failure indicator is absent from the operative-native constituent matter. Rather, even if an element or a molecule of the failure indicator is also present in operating-native constituent matter at non-negligible concentrations, if the element or molecule does not substantially increase in concentration over the course of operating life of a mechanical system, then a characteristic spectrum of the failure indicator can still be distinguishable from a characteristic spectrum of operating-native constituent matter.

By way of example, elements and molecules present in lubricant additives (for a particular mechanical system) but not present in wear debris (for that particular mechanical system) and not present in contaminants (for an operating environment of that particular mechanical system) do not substantially increase in concentration over the normal operation of a mechanical system (and can decrease in concentration in the event of performance degradation or failures).

For instance, molybdenum can appear in lubricant additives used in a particular mechanical system, does not generally appear in contaminants, and does not appear in wear debris unless the mechanical system includes molybdenum alloys. Thus, for a mechanical system that does not include molybdenum alloys, failure indicators containing molybdenum can have characteristic spectra distinguishable from characteristic spectra of operating-native constituent matter.

For instance, magnesium can appear in lubricant additives used in a particular mechanical system, does not generally appear in wear debris, and does not appear in contaminants unless mechanical systems are operated in an environment where hard water or particular debris containing calcium is present at substantial levels. Thus, for a mechanical system that is not operated in such environments, failure indicators containing magnesium can have characteristic spectra distinguishable from characteristic spectra of operating-native constituent matter.

For instance, lead does not appear in lubricant additives, does not generally appear in contaminants (in non-hazardous operating environments), and generally appears in wear debris in some background levels in most mechanical systems. Thus, for most mechanical systems, failure indicators containing lead can have characteristic spectra distinguishable from characteristic spectra of operating-native constituent matter (though it may be undesired to introduce such heightened levels of lead into many mechanical systems, due to its toxic properties, unless the mechanical system is already operating in a toxic, yet substantially lead-free, environment).

Thus, it should be understood that while failure indicator elements and/or molecules can be embedded in non-metallic wear components to indicate abrasive wear, failure indicator elements and/or molecules can still be metallic in nature.

Such failure indicator elements and/or molecules having characteristic spectra distinguishable from characteristic spectra of operating-native constituent matter shall not be limited to the above examples, and should be understood as encompassing any such elements and/or molecules which accord with the above description for operating-native constituent matter of an operating mechanical system; which would not, themselves, corrode, abrade, damage, or otherwise cause failure of elastomeric seals; which would not degrade lubrication performance of lubricants and lubricant additives of an operating mechanical system; which is abundant in at least non-diluted form, if not in pure form, and is readily purchased in high volumes without limitation as to geographic location; and which would not chemically react with lubricants and lubricant additives of an operating mechanical system in a volatile or hazardous fashion. Such failure indicator elements and/or molecules should also be non-toxic unless the mechanical system is operating in a toxic environment (which is nevertheless substantially free of the failure indicator elements and/or molecules). Such failure indicator elements and/or molecules are subsequently referred to as "spectrally distinguishable," for brevity.

Furthermore, according to SOA techniques, mechanical systems generally include lubricant filters which exclude particulate matter above a particular size (subsequently, an "exclusion size limit") from lubricant running through the filters. Thus, downstream from a lubricant filter, large contaminant particles can be excluded from lubricant. Lubricant samples collected for application of SOA techniques can be collected from upstream of a lubricant filter or downstream from a lubricant filter. In the event that a failure indicator includes particulate matter which is non-soluble in lubricant, depending on the size of failure indicator particulate matter, lubricant samples collected for detection of failure indicator elements and/or molecules can be taken upstream of a lubricant filter in the event that failure indicator particulate matter is larger than an exclusion size limit of the lubricant filter, and can be taken upstream or downstream of a lubricant filter in the event that failure indicator particular matter is smaller than an exclusion size limit of the lubricant filter.

By way of example, in the event that failure indicator particulate matter could interfere with the function of other mechanical components of the mechanical system, the particulate matter should be larger than an exclusion size limit of the lubricant filter, and the lubricant samples should be taken upstream from the lubricant filter. In the event that the mechanical system is physically configured such that it is difficult for persons to access or reach lubricant samples upstream of the lubricant filter, then the particulate matter should be of a nature which minimally interferes with the function of other mechanical components of the mechanical system, and lubricant samples can be taken downstream from the lubricant filter.

Furthermore, for reasons that will be subsequently elaborated upon, according to various example embodiments of the present disclosure, a failure indicator can include elements and/or molecules which survive the vulcanization process of elastomeric molding, such as high-temperature conditions. According to example embodiments of the present disclosure, an elastomeric seal has one or more failure indicators including a spectrally distinguishable element and/or molecule underlying at one or more subsurface distances, including at least one subsurface distance within an incipient failure region.

Figure 3:
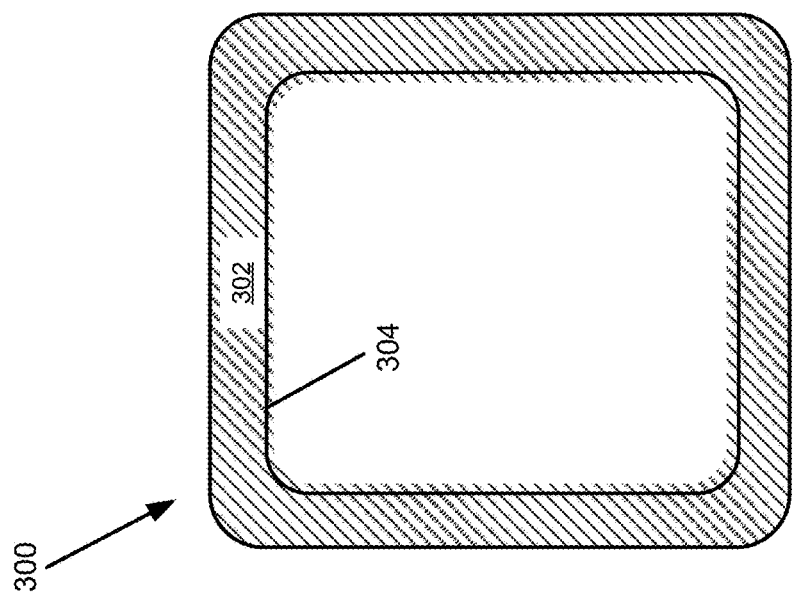
FIG. 3 illustrates a cross-section view of an elastomeric seal including an incipient failure region and a subsurface underlying failure indicator.

FIG. 3 illustrates a cross-section view of an elastomeric seal 300 including an incipient failure region and a subsurface underlying failure indicator. The incipient failure region 302 includes a hatched region of at least one outer face (which may be circular, or may have any other geometric shape) of the elastomeric seal 300. At an inner edge of the incipient failure region 302 (where, approximately, the reach of abrasive wear to this inner edge does not yet lead to catastrophic failure of a dynamic seal), a failure indicator is embedded through a subsurface stratum 304 of the elastomeric seal 300 across at least part of at least one outer face of the elastomeric seal 300.

Distances from the subsurface stratum 304 to an outer face of the elastomeric seal 300 can be approximately even (at a scale of millimeters) across the length of the subsurface stratum 304, as illustrated by the distance between the outer face of the elastomeric seal 300 and the subsurface stratum 304. Where the elastomeric seal 300 is substantially circular in cross-section, a subsurface stratum 304 can be substantially circumferential across at least part of an inner circumference. Where the elastomeric seal has multiple faces, one or more subsurface strata 304 can underlie one or more faces of the elastomeric seal 300.

After the elastomeric seal 300 is installed in a mechanical system to provide a dynamic seal, over operating life of the mechanical system, abrasive wear of the elastomeric seal 300 can, over time, expose at least part of the subsurface stratum 304. Since the elastomeric seal 300 is lubricated as with other wear components of a mechanical system (and the elastomeric seal 300 can, furthermore, be self-lubricated), exposure of the subsurface stratum 304 causes the failure indicator including a spectrally distinguishable element and/or molecule to mingle with lubricant of the mechanical system, whereupon the failure indicator can be dissolved in the event that it includes a hydrophobic molecule, and can be carried in the lubricant in the event that it includes particulate matter.

Consequently, a computing system configured to perform spectroscopic analysis performed on lubricant samples from the mechanical system, as described above, can further be configured to record a failure-indicating characteristic spectrum of a spectrally distinguishable element or molecule of the failure indicator. The computing system can be further configured to detect that a difference spectrum includes, or does not include, a failure-indicating characteristic spectrum.

By way of example, the computing system can be configured to perform regression on the difference spectrum to determine that the failure-indicating characteristic spectrum is, or is not, among constituent spectra that make up the difference spectrum.

In the event that the computing system determines that the failure-indicating characteristic spectrum is among the constituent spectra, a mechanical system operator can, based on this determination, remove the mechanical system from operation and replace one or more elastomeric seals, forestalling future degradation of performance resulting from future incipient failure or one or more elastomeric seals and/or preventing further degradation of performance resulting from incipient failure of one or more elastomeric seals, lowering the risk of the one or more elastomeric seals reaching the point of catastrophic failure.

According to example embodiments of the present disclosure, a same elastomeric seal can include multiple subsurface strata at different distances from an outer face of the elastomeric seal, and a same or a different failure indicator, each including different spectrally distinguishable elements and/or molecules, can be embedded over each different subsurface stratum. Thus, abrasive wear of the elastomeric seal can, over time, progressively expose at least part of a shallowest subsurface stratum, then at least part of a next-shallowest subsurface stratum, and so forth until at least part of the deepest subsurface stratum. Progressive exposure of each deeper subsurface stratum causes a same failure indicator to mingle with lubricant of the mechanical system in progressively higher concentrations, or causes a different failure indicator, including a different spectrally distinguishable element and/or molecule, to mingle with lubricant of the mechanical system.

Consequently, a computing system configured to perform spectroscopic analysis performed on lubricant samples from the mechanical system, as described above, can further be configured to detect that a difference spectrum includes a failure-indicating characteristic spectrum of lower magnitudes and of higher magnitudes, where lower magnitudes indicate that only a shallower subsurface stratum has been exposed by abrasive wear, while higher magnitudes indicate that deeper subsurface strata have been exposed by abrasive wear.

The computing system can further be configured to record multiple failure-indicating characteristic spectra of spectrally distinguishable elements or molecules of multiple failure indicators, each failure-indicating characteristic spectrum being ordered from a shallowest subsurface stratum to a deepest subsurface stratum of embedding in an elastomeric seal (subsequently, "consecutively ordered from shallowest" shall refer to one or more of these failure-indicating characteristic spectra in consecutive order from shallowest). The computing system can be further configured to detect that a difference spectrum includes, or does not include, one or more failure-indicating characteristic spectra, consecutively ordered from shallowest.

By way of example, the computing system can be configured to perform regression on the difference spectrum to determine that one or more failure-indicating characteristic spectra, consecutively ordered from shallowest, are, or are not, among constituent spectra that make up the difference spectrum. (It is unlikely that abrasive wear would expose non-consecutive subsurface strata without exposing those in between, or expose deeper subsurface strata without exposing shallower subsurface strata; therefore, the computing system can be configured to discount or down-weigh the possibility that multiple failure-indicating characteristic strata, which are not consecutively ordered from shallowest, are among the constituent strata of the difference spectrum.)

In the event that the computing system determines that the one or more failure-indicating characteristic spectra, consecutively ordered from shallowest, is or are among the constituent spectra, a mechanical system operator can, based on this determination, decide whether to remove the mechanical system from operation and replace one or more elastomeric seals. The presence of one failure indicating character spectrum of a smaller magnitude, or the presence of fewer different failure-indicating characteristic spectra, can indicate that abrasive wear is at an earlier stage of incipient failure, and the presence of one failure indicating character spectrum of a larger magnitude, or the presence of more different failure-indicating characteristic spectra, can indicate that abrasive wear is at a later stage of incipient failure.

According to example embodiments of the present disclosure, different elastomeric seals of a same mechanical system can include different failure indicators, each including different spectrally distinguishable elements and/or molecules, embedded respectively therein. Thus, abrasive wear of different elastomeric seals can expose subsurface strata having different failure indicators embedded therein, each exposure causing a different spectrally distinguishable element and/or molecule to mingle with lubricant of the mechanical system.

Consequently, a computing system configured to perform spectroscopic analysis performed on lubricant samples from the mechanical system, as described above, can further be configured to record multiple failure-indicating characteristic spectra of spectrally distinguishable elements or molecules of multiple failure indicators. The computing system can be further configured to detect that a difference spectrum includes, or does not include, one or more of these failure-indicating characteristic spectra. As long as a mechanical system does not include more than one elastomeric seal having the same failure indicator embedded, each different failure-indicating characteristic spectrum can indicate abrasive wear and incipient failure of a different elastomeric seal. Mechanical system operators can expressly identify and replace those elastomeric seals exhibiting abrasive wear without the need to manually inspect or replace elastomeric seals not exhibiting abrasive wear.

Furthermore, for each replacement of an elastomeric seal, mechanical system operators can rotate the mechanical system through elastomeric seals having progressively different failure indicators embedded for each replacement. Therefore, the detection of different failure-indicating characteristic spectra can indicate a number of times that elastomeric seals have been replaced in a mechanical system.

According to example embodiments of the present disclosure, a hydraulic actuator component of a mechanical system can have installed one or more elastomeric seals providing dynamic seals, each elastomeric seal having a subsurface underlying incipient failure indicator embedded. By way of example, FIG. 4 illustrates the hydraulic cylinder 100 of FIG. 1, having installed elastomeric seals providing dynamic seals.

As illustrated in FIG. 1, within each of the glands 114A, 118A, and 120A of the hydraulic cylinder 100, a respective elastomeric seal 414B, 418B, and 420B is set. Each of the elastomeric seals is confined within its respective gland by the adjacency of a surface next to the respective gland, enclosing the gland. Each of the elastomeric seals can move freely within its respective gland, providing a dynamic seal.

As described above with reference to FIG. 3 according to various example embodiments of the present disclosure, each of the elastomeric seals 414B, 418B, and 420B can have a same failure indicator embedded therein; and each of the elastomeric seals 414B, 418B, and 420B can have a different failure indicator embedded therein. Thus, both piston seals and rod seals of the hydraulic cylinder can have failure indicators embedded therein. Furthermore, any, some, or all of the elastomeric seals 414B, 418B, and 420B can have more than one different failure indicator embedded therein at multiple subsurface strata of different depths.

Figure 4:
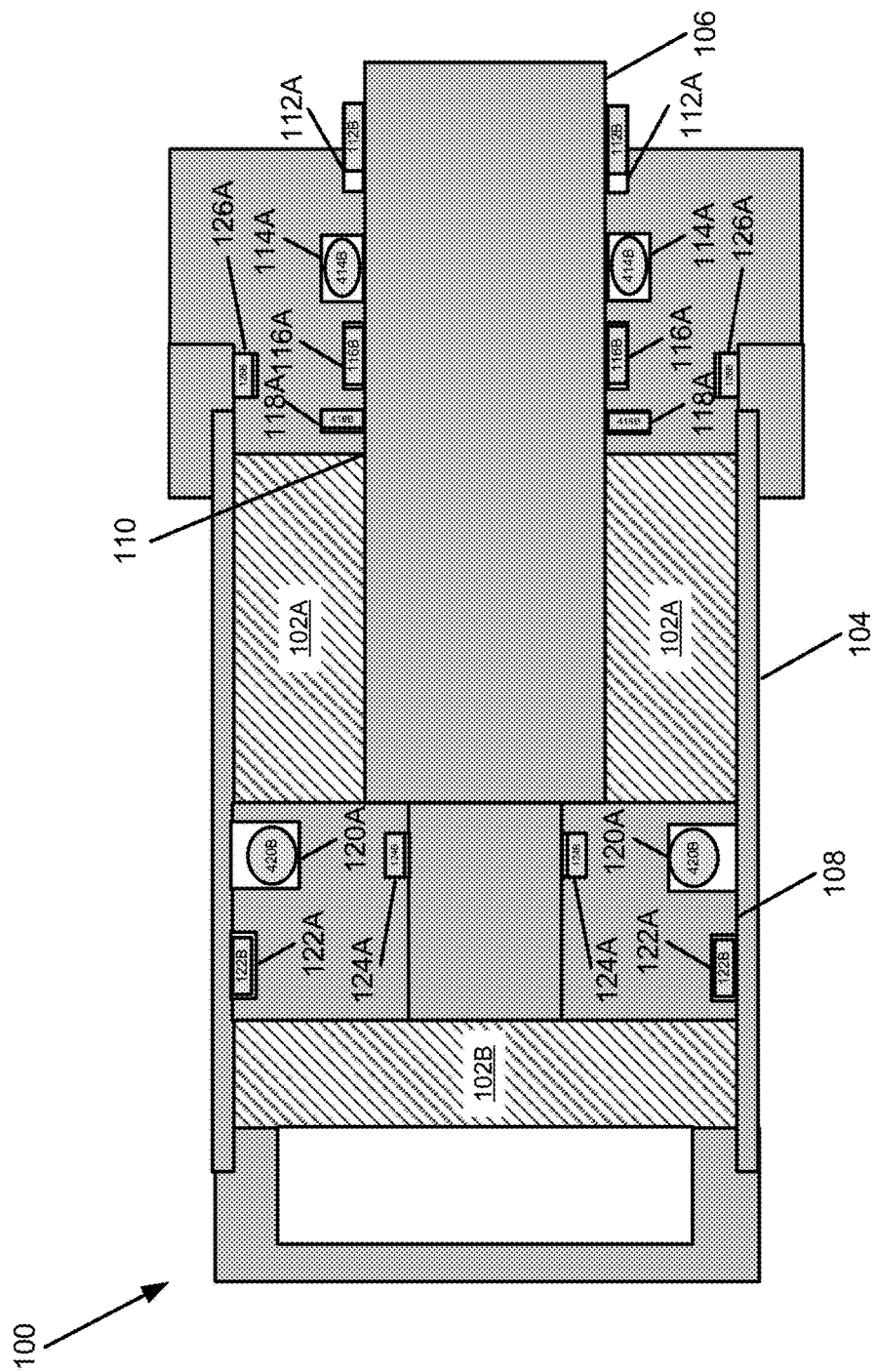
FIG. 4 illustrates the hydraulic cylinder of FIG. 1, having installed elastomeric seals providing dynamic seals.

Furthermore, according to example embodiments of the present disclosure, a mechanical system can have installed any number of hydraulic actuator components, each one, as illustrated in FIG. 4 above, having installed one or more elastomeric seals providing dynamic seals, each elastomeric seal having a subsurface underlying incipient failure indicator embedded.

As described above with reference to FIG. 3 and FIG. 4 according to various example embodiments of the present disclosure, each of the elastomeric seals of such a mechanical system can have a same failure indicator embedded therein; and each of the elastomeric seals of such a mechanical system can have a different failure indicator embedded therein. Furthermore, elastomeric seals of a first hydraulic actuator component can have a first failure indicator embedded therein, while elastomeric seals of a second hydraulic actuator component can have a second failure indicator embedded therein. As long as a mechanical system does not include more than one hydraulic actuator component having elastomeric seals having the same failure indicator embedded, each different failure-indicating characteristic spectrum can indicate abrasive wear and incipient failure of elastomeric seals of a different hydraulic actuator component. Mechanical system operators can expressly service and replace elastomeric seals for one hydraulic actuator component without the need to manually inspect or replace elastomeric seals of a different hydraulic actuator component not exhibiting abrasive wear.

Any, some, or all of the elastomeric seals of the mechanical system can have more than one different failure indicator embedded therein at multiple subsurface strata of different depths.

According to example embodiments of the present disclosure, an elastomeric seal having a subsurface underlying incipient failure indicator embedded can be manufactured by various manufacturing processes wherein an elastomeric member can be made in more than one stage, or as two members which are subsequently bonded. Thus, an inner core member of an elastomeric seal (not part of the incipient failure region) can be first manufactured by subjecting a polymeric material to a molding and vulcanization process; a failure indicator can be applied to at least part of the outer face of the inner core; and an outer layer member of the elastomeric seal can be manufactured upon the inner core by subjecting additional polymeric material to the molding and vulcanization process, where the outer layer can be molded over top of the inner core or the outer layer can be molded separately and bonded to the inner core. According to example embodiments of the present disclosure, this process can be repeated, wherein each outer layer becomes the outer face of a new inner core, having a same or a different failure indicator applied to its outer face, then having a new outer layer molded over its top, or a new outer layer molded separately and bonded thereto.

By way of example, such manufacturing processes can include a two-shot molding process, such as an overmolding process. By such a process, the inner core can be molded and cured in a smaller mold; a failure indicator can be applied to at least part of an outer face of the inner core; and the inner core having a failure indicator applied can be placed in a larger mold, wherein an outer layer is molded and cured around the inner core. This process can be repeated to embed failure indicators in multiple subsurface strata, progressively molding outer layers over each stratum. The failure indicator should include elements and/or molecules which tolerate high-temperature conditions so as to survive the vulcanization process, as described above.

By way of example, such manufacturing processes can include a vulcanization bonding process. By such a process, the inner core can be molded and cured in a first mold; a failure indicator can be applied to at least part of an outer face of the inner core; an outer layer can be molded and cured in a second mold; and the outer layer can be bonded to the outer face of the inner core by further vulcanization of the two pieces. This process can be repeated to embed failure indicators in multiple subsurface strata, progressively bonding outer layers over each stratum. The failure indicator should include elements and/or molecules which tolerate high-temperature conditions so as to survive the vulcanization process, as described above.

By way of further example, any elastomeric manufacturing technique which bonds two elastomeric members can, according to example embodiments of the present disclosure, embed a failure indicator between the two bonded members. For instance, conveyor belts are manufactured by splicing two elastomeric members joined end-to-end or joined by mating counterpart edges. According to example embodiments of the present disclosure, a failure indicator can be applied to the join between two elastomeric members, yielding a conveyor belt which has an underlying incipient failure indicator embedded therein.

Furthermore, the present disclosure provides a wear indicator borne in a sealed cavity of a mechanical system (a "cavity-borne wear indicator"). Mechanical systems can include hollowed cavities which are sealed to block passage of free mechanical elements, rather than passage of fluid. By way of example, pistons and/or rods of other actuators, including hydraulic actuators, pneumatic actuators, combustion engine actuators, and the like, can be borne in their directional motion by linear bearings, mechanical assemblies which carry the load of a piston, rod, and the like within two circular races which hold rolling elements in between to reduce friction of the load. Likewise, rotating elements such as shafts and axles can be borne in their rotational motion by rotary bearings, which carry the load in a similar fashion. In either case, the sides of the circular races can be sealed by elastomeric seals which seal the rolling elements within cavities blocked from outside contamination and leakage. Such elastomeric seals are, likewise, wear components as described herein.

According to example embodiments of a cavity-borne wear indicator, a wear indicator as described above can be carried in a solvent or a non-solvent fluid and borne in a sealed cavity of a mechanical system, or a fluid wear indicator can be borne in a sealed cavity of a mechanical system. As described above, after a wear component sealing the sealed cavity begins to exhibit incipient failure, the wear indicator can be gradually released from the sealed cavity. The failure indicator including a spectrally distinguishable element and/or molecule can mingle with coolant of the mechanical system, whereupon the failure indicator can be dissolved in the event that it includes a hydrophilic molecule, and can be carried in the coolant in the event that it includes particulate matter.

A computing system configured to perform spectroscopic analysis performed on coolant samples from the mechanical system, as described above, can detect that a difference spectrum includes, or does not include, a failure-indicating characteristic spectrum.

Figure 5:
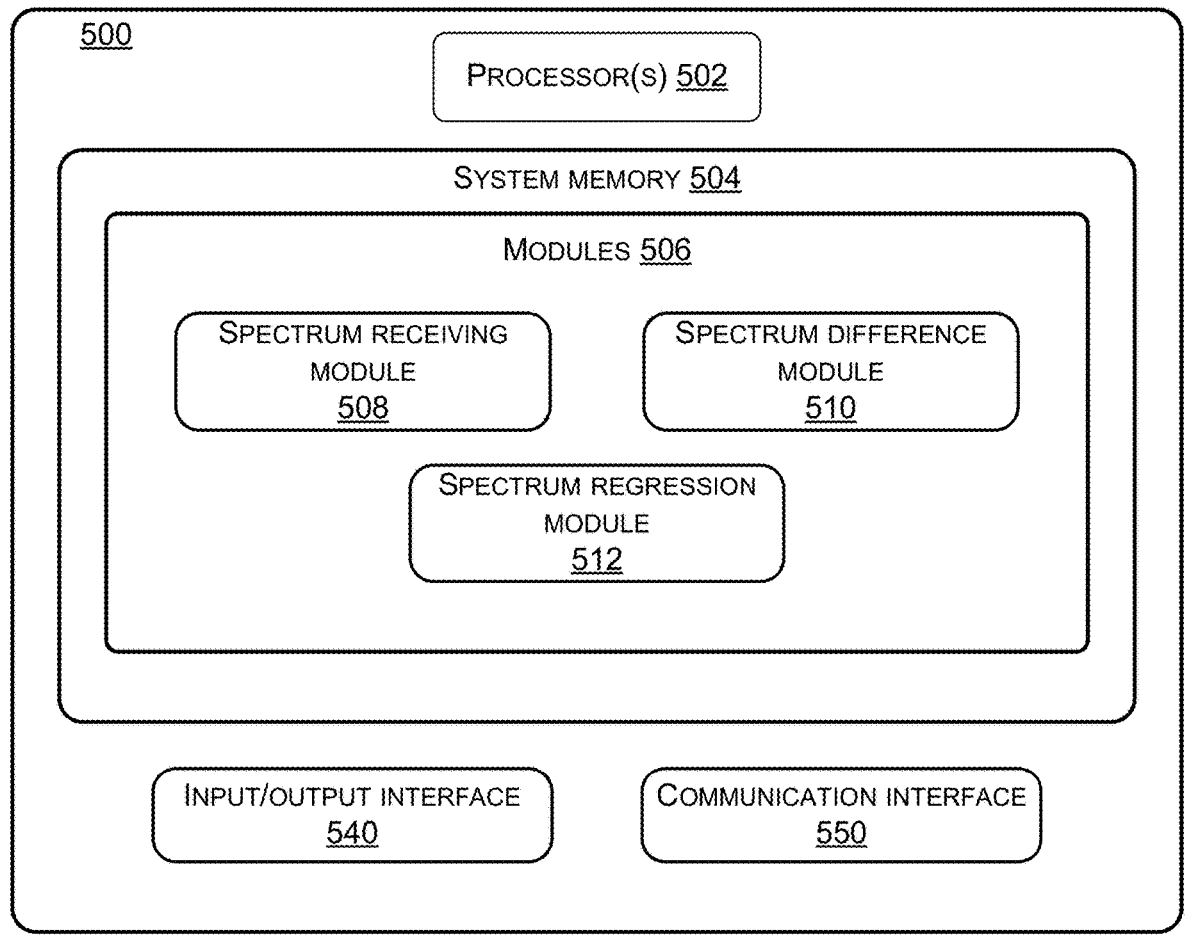
FIG. 5 illustrates an example computing system for implementing the spectroscopic analysis techniques as described herein.

FIG. 5 illustrates an example computing system 500 for implementing the spectroscopic analysis techniques as described above.

The techniques and mechanisms described herein may be implemented by multiple instances of the computing system 500, as well as by any other computing device, system, and/or environment. The computing system 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing system 500 may include one or more processors 502 and system memory 504 communicatively coupled to the processor(s) 502. The processor(s) 502 and system memory 504 may be physical or may be virtualized and/or distributed. The processor(s) 502 may execute one or more modules and/or processes to cause the processor(s) 502 to perform a variety of functions. In embodiments, the processor(s) 502 may include a central processing unit ("CPU"), a graphics processing unit ("GPU"), both CPU and GPU, or other processing units or components known in the art. Additionally, each of the processor(s) 502 may possess its own local memory, which also may store program modules, program data, and/or one or more operating systems.

Depending on the exact configuration and type of the system 500, the system memory 504 may be volatile, such as RAM, non-volatile, such as ROM, flash memory, miniature hard drive, memory card, and the like, or some combination thereof. The system memory 504 may include one or more computer-executable modules 506 that are executable by the processor(s) 502.

The modules 506 may include, but are not limited to, a spectrum receiving module 508, a spectrum difference module 510, and a spectrum regression module 512.

The spectrum receiving module 508 can configure one or more processors to sample spectra for an operating lubricant sample as input as described above.

The spectrum difference module 510 can configure one or more processors to compare a sample spectra against a reference spectrum for the same lubricant to derive a difference spectrum as described above.

The spectrum regression module 512 can configure one or more processors to perform regression on the difference spectrum to determine multiple constituent spectra that make up the difference spectrum as described above.

The computing system 500 may additionally include an input/output (I/O) interface 540 allowing the computing system 500 to communicate with an input apparatus, such as a radiation detector as described above which converts radiation to electrical signals, and converts the electrical signals to one or more spectra measurements; and a communication module 550 allowing the computing system 900 to communicate with other systems and devices over a network. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

INDUSTRIAL APPLICABILITY

It is desired to detect wear, nibbling, cracking, spiral failure, and other such modes of incipient failure in wear components of mechanical systems during as early a stage as possible, before such failures result in leakage and impact machinery performance, such as hydraulic cylinder performance. However, as wear components such as elastomeric seals are deeply integrated into running machinery and cannot be accessed unless mechanical parts are disassembled, and mechanical parts may not be accessible unless an overall mechanical system is removed from service and disassembled (for example, on machinery such as excavators or aerial work platforms, where a hydraulic cylinder is substantially elevated), it is desired to detect incipient failure in a wear component without having direct physical access to the wear component.

Mechanical systems include non-metallic wear components, such as elastomeric seals. Elastomeric seals are formed from elastomeric compounds which do not include pure elements whose characteristic spectra can be readily distinguished from characteristic spectra of operating lubricant, by spectroscopic analysis targeting elemental composition. Furthermore, the polymeric cross-links making up elastomeric seals have similar molecular bonds as lubricants (both including many hydrocarbon molecules), and so they also do not include molecules whose characteristic spectra can be readily distinguished from characteristic spectra of operating lubricant, by spectroscopic analysis targeting molecular composition.

Consequently, while the incipient failure of metallic wear components can be detected indirectly over the operating life of a mechanical system by SOA techniques, the incipient failure of non-metallic wear components cannot be readily detected in a similar fashion. Therefore, wear of non-metallic wear components is far more readily detected by inspection, which can only occur when a mechanical system is removed from operation; in the event that incipient failure of elastomeric seals occurs in a mechanical system sooner than detection of incipient failure of mechanical wear components, mechanical system operators may lack a rationale to remove the mechanical system from operation (which can be a costly process) to inspect elastomeric seals for wear, and thus the mechanical system can suffer from degraded, suboptimal performance for some amount of time (which can incur costs in its own right) before the incipient failure can be detected. Furthermore, mechanical system operators may replace elastomeric seals only after a mechanical system has been operated for some number of operating hours; such a replacement policy is rigid and inflexible, and does not reflect actual state to which the dynamic seals provided by those seals may or may not have degraded.

According to example embodiments of the present disclosure, therefore, spectroscopic analysis performed on lubricant samples from the mechanical system can further identify a failure-indicating characteristic spectrum of a spectrally distinguishable element or molecule of the failure indicator. By receiving sample spectra for an operating lubricant sample as input, comparing a sample spectra against a reference spectrum for the same lubricant to derive a difference spectrum, and performing regression on the difference spectrum to determine multiple constituent spectra that make up the difference spectrum, it is possible to determine that the failure-indicating characteristic spectrum is, or is not, among constituent spectra that make up the difference spectrum.

Upon a determination that the failure-indicating characteristic spectrum is among the constituent spectra, a mechanical system operator can, based on this determination, remove the mechanical system from operation and replace one or more elastomeric seals, forestalling future degradation of performance resulting from future incipient failure or one or more elastomeric seals and/or preventing further degradation of performance resulting from incipient failure of one or more elastomeric seals, lowering the risk of the one or more elastomeric seals reaching the point of catastrophic failure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. An elastomeric member, comprising:
   an outer face;
   a first subsurface stratum underlying at least part of the outer face;
   a first incipient failure indicator embedded through the first subsurface stratum, wherein the first incipient failure indicator comprises a first element or a first molecule spectrally distinguishable from operating-native constituent matter of a mechanical system in which the elastomeric member is operating, and the first incipient failure indicator further comprises particulate matter smaller than an exclusion size limit of a lubricant filter of the mechanical system;
   a second subsurface stratum underlying at least part of the first subsurface stratum; and
   a second incipient failure indicator embedded through the second subsurface stratum, wherein the second incipient failure indicator comprises a second element or a second molecule spectrally distinguishable from operating-native constituent matter of a mechanical system.

2. The elastomeric member of claim 1, wherein distances from the first subsurface stratum to the outer face of the elastomeric member are substantially even across a length of the first subsurface stratum.

3. The elastomeric member of claim 1, wherein the first subsurface stratum and the second subsurface stratum underlie the outer face at a plurality of subsurface distances.

4. The elastomeric member of claim 3, wherein the first incipient failure indicator and the second incipient failure indicator respectively comprise a same element or a same molecule.

5. The elastomeric member of claim 3, wherein the first incipient failure indicator and the second incipient failure indicator respectively comprise a different element or a different molecule.

6. The elastomeric member of claim 1, wherein the first incipient failure indicator comprises one of cerium, yttrium, lanthanum, scandium, zirconium, molybdenum, magnesium, or lead.

7. An actuator, comprising:
   a barrel;
   a piston member;
   a rod member;
   a first elastomeric seal fitted into a circumferential first gland of the piston member adjacent to the barrel; and
   a second elastomeric seal fitted into a circumferential second gland of the barrel adjacent to the rod member;
   wherein the first elastomeric seal comprises a first subsurface stratum having a first incipient failure indicator embedded through the first subsurface stratum;
   wherein the second elastomeric seal comprises a second subsurface stratum having a second incipient failure indicator embedded through the second subsurface stratum; and
   wherein the first incipient failure indicator and the second incipient failure indicator each comprises particulate matter smaller than an exclusion size limit of a lubricant filter of a mechanical system.

8. The actuator of claim 7, wherein the first incipient failure indicator and the second incipient failure indicator each comprise an element or a molecule spectrally distinguishable from operating-native constituent matter of a mechanical system.

9. The actuator of claim 7, wherein the first incipient failure indicator and the second incipient failure indicator respectively comprise a same element or a same molecule.

10. The actuator of claim 7, wherein the first incipient failure indicator and the second incipient failure indicator respectively comprise a different element or a different molecule.

11. The actuator of claim 7, wherein the first elastomeric seal comprises a third subsurface stratum having the first incipient failure indicator embedded through the third subsurface stratum; and wherein the second elastomeric seal comprises a fourth subsurface stratum having the second incipient failure indicator embedded through the fourth subsurface stratum.

12. The actuator of claim 7, wherein the first elastomeric seal comprises a third subsurface stratum having a third incipient failure indicator embedded through the third subsurface stratum; and
wherein the second elastomeric seal comprises a fourth subsurface stratum having a fourth incipient failure indicator embedded through the fourth subsurface stratum;
wherein the first incipient failure indicator and the third incipient failure indicator respectively comprise a different element or a different molecule; and
wherein the second incipient failure indicator and the fourth incipient failure indicator respectively comprise a different element or a different molecule.

13. A system, comprising:
a first hydraulic actuator comprising a first elastomeric seal fitted into a circumferential first gland of the first hydraulic actuator, the first elastomeric seal having a first subsurface stratum with a first incipient failure indicator embedded through the first subsurface stratum;
a second hydraulic actuator comprising a second elastomeric seal fitted into a circumferential second gland of the second hydraulic actuator, the second elastomeric seal having a second subsurface stratum having a second incipient failure indicator embedded through the second subsurface stratum, wherein the first incipient failure indicator and the second incipient failure indicator each comprise an element or a molecule spectrally distinguishable from operating-native constituent matter of a mechanical system in which the elastomeric member is operating, and wherein the first incipient failure indicator and the second incipient failure indicator each comprises particulate matter smaller than an exclusion size limit of a lubricant filter of the mechanical system;
a spectroscopic sensor fluidically coupled with the first hydraulic actuator or the second hydraulic actuator and configured to detect the first incipient failure indicator or the second incipient failure indicator; and
a computing device communicably coupled with the spectroscopic sensor and configured to generate a notification in response to the spectroscopic sensor detecting the first incipient failure indicator or the second incipient failure indicator.

14. The system of claim 13, wherein:
the operating-native constituent matter of the mechanical system comprises wear debris, a contaminant, and a lubricant additive;
the first incipient failure indicator comprises an element or a molecule of at least one of the wear debris, the contaminant, and the lubricant additive, which does not substantially increase in concentration in a lubricant of the mechanical system during operation of the mechanical system; and
the second incipient failure indicator comprises an element or a molecule of at least one of the wear debris, the contaminant, and the lubricant additive, which does not substantially increase in concentration in a lubricant of the mechanical system during operation of the mechanical system.

15. The system of claim 13, wherein:
the operating-native constituent matter of the mechanical system comprises wear debris, a contaminant, and a lubricant additive;
the first incipient failure indicator comprises an element or a molecule not present in the wear debris, the contaminant, or the lubricant additive; and
the second incipient failure indicator comprises an element or a molecule not present in the wear debris, the contaminant, or the lubricant additive.

16. The system of claim 13, wherein the mechanical system does not include more than one elastomeric seal having the same incipient failure indicator embedded.

17. The system of claim 13, wherein each elastomeric seal of the mechanical system has the same incipient failure indicator embedded.

* * * * *